Oct. 4, 1932.  F. B. WINES  1,880,630
HEATING APPARATUS FOR AUTOMOTIVE VEHICLES
Filed May 7, 1930   3 Sheets-Sheet 3
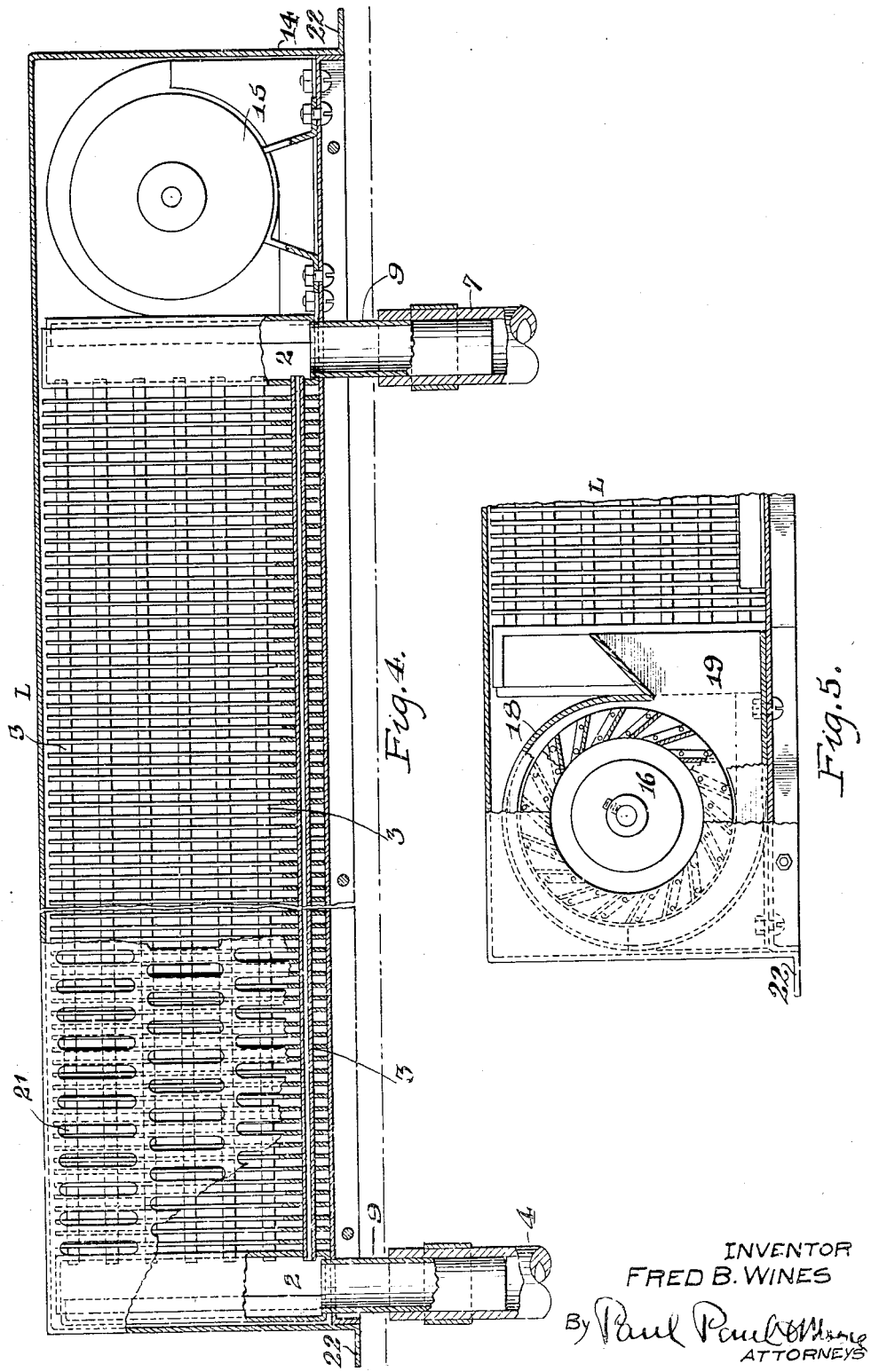
INVENTOR
FRED B. WINES
By Paul Paulson
ATTORNEYS Patented Oct. 4, 1932

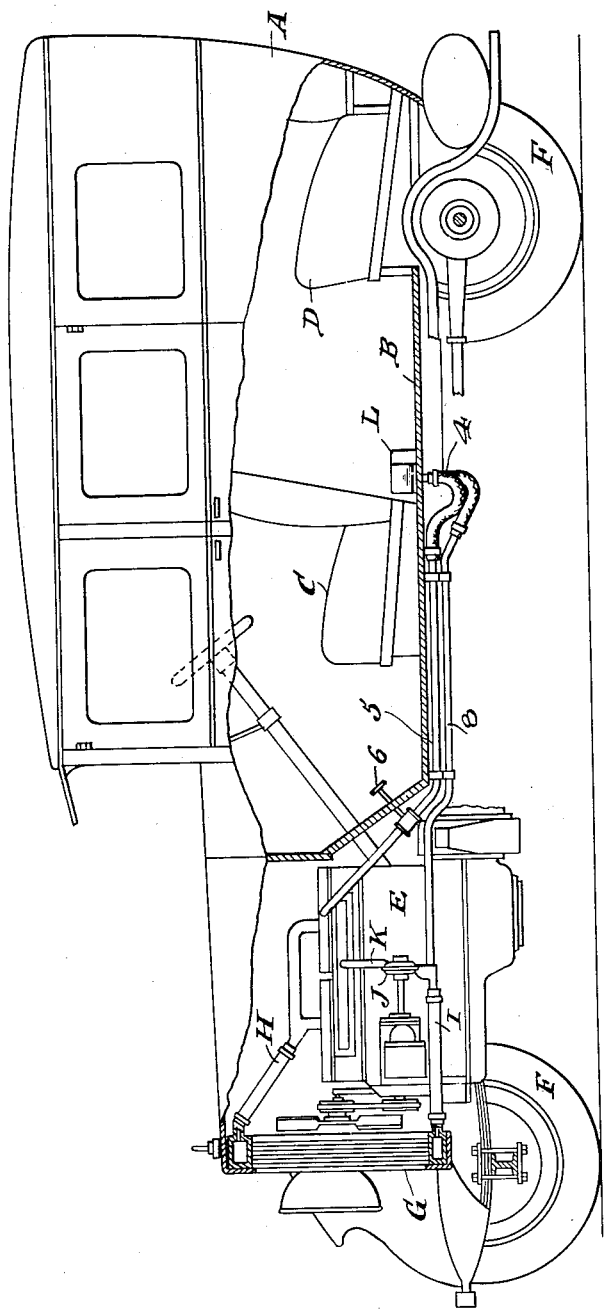

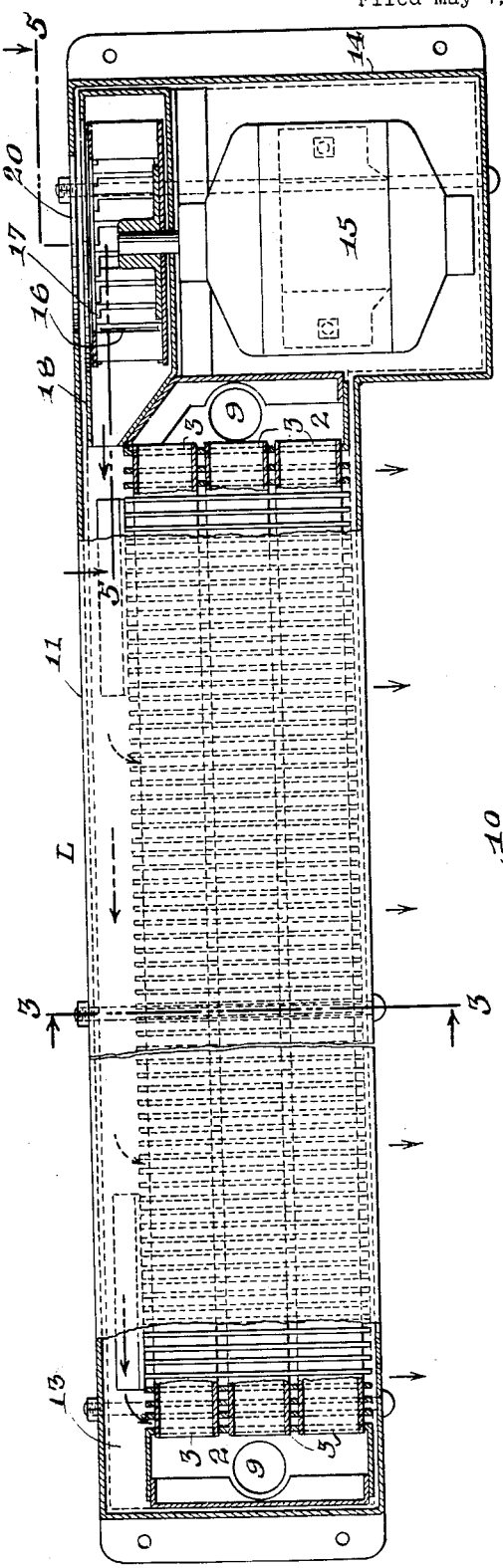

1,880,630

UNITED STATES PATENT OFFICE

FRED B. WINES, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed May 7, 1930. Serial No. 450,442.

This invention relates to an apparatus for heating automotive vehicles, and particularly to a heater designed to be located in the rear compartment or rear portion of a sedan, taxi-cab, or other car having more than one seat, and to be located upon the floor of the car, or upon a suitable support, and preferably extending crosswise of the car body and in proximity to the rear of the front seat.

The heater herein disclosed is of the same general type as the heater disclosed in the application of Vernon J. Butterfield, Serial No. 341,403, filed February 20, 1929, and those disclosed in my pending applications, Serial No. 394,697, filed September 23, 1929, and Serial No. 423,064, filed January 24, 1930, which has now matured into Patent No. 1,859,482, issued May 24, 1932. The present application discloses modifications of, and improvements upon, the heaters disclosed in the applications above identified.

The invention consists generally in the constructions and combinations hereinafter described and particularly pointed out in the claim.

In the accompanying drawings forming part of this specification,

Figure 1 is a side elevation, partly broken away, of a two-seat closed body car, of the type generally designated a "sedan", having my improved heater applied thereto;

Figure 2 is a plan view of the heating unit, the top wall of the casing being broken away at its end portions, and the end portions of the liquid receiving chamber being shown in horizontal section;

Figure 3 is a transverse vertical section on line 3—3 of Figure 2;

Figure 4 is a front elevation, partly broken away and partly in section, of the liquid heating chamber and motor;

Figure 5 is a vertical section on line 5—5 of Figure 2.

In the drawings A represents, as a whole, the car body; B, the floor thereof; C, the front seat; D, the rear seat; E, the motor; F, the wheels; G, the radiator; H, I, K, the connections between the water jacket of the motor and the radiator, the connection I, K being provided with the pump J, for creating the circulation through the radiator and the water jacket of the motor, and liquid receiving chamber of this heater.

These parts are all of usual construction and arrangement in automotive vehicles.

The liquid receiving and air heating unit, designated on the drawings, as a whole, by the reference letter L, is composed mainly of a chamber, preferably formed of the vertically arranged compartments 2, 2, spaced apart substantially the desired length of the heater, and united by the series of tubes 3, 3. These tubes are also spaced apart, as shown most clearly in Figure 3. The tubes 3, 3 may be of the flattened form in cross-section shown in Figure 3.

One of the compartments 2, of the chamber L, is connected by a suitable coupling 4 to a tube or pipe 5 leading from the engine water jacket. The pipe 5 is preferably provided with a valve 6, arranged to be operable from the interior of the car body (see Figure 1) and by means of which the circulation of water through the liquid receiving chamber may be controlled or stopped.

The other compartment 2 of the chamber L is connected, through coupling 7, to a tube or pipe 8 that leads to the pump J.

The chamber L is provided with tube connections 9, 9, one for each compartment 2, which preferably extend through the car floor, and to which the couplings 4 and 7 are secured.

A series of plates 10, 10, preferably arranged vertically and suitably spaced apart, are provided through which the tubes 3, 3 of chamber L extend (see Figure 2). These plates, with the tubes 3, form air passages through the chamber L. A casing 11, having a suitable bottom wall or floor 12, encloses the air heating chamber. This chamber is of sufficient depth (from front to rear) to provide a flue or air-passage 13 extending back, and preferably the full length, of the air heating chamber.

The casing 11 has an extension 14 connected thereto or formed integrally therewith and located at one end thereof. A suitable electric motor 15, preferably a variable speed motor, is located within the extension 14, and the shaft of the motor is connected with the hub of a fan 16 arranged within a fan casing 18, the open center 17 of the fan casing being arranged opposite an opening 20 in the casing 11. The discharge opening 19 of the fan casing communicates with the air passage 13 extending along the casing 11 in the rear of the air heating chamber.

The bottom 12 of the casing 11 is preferably provided with vertical flanges 12ª and the main section of the casing 11 is removably secured to the bottom by suitable means such as the bolts 11ᵇ extending through said flanges and through the walls of the casing.

The front wall of the casing 11 is provided with suitable openings 21 to permit the escape of air that has been heated by traveling through the air passage-ways in the liquid-receiving air-heating chamber. The last named chamber is preferably secured to the bottom wall 12 of the casing. The motor 15, the fan casing and fan support are also preferably secured to the wall 11. The casing 11 is preferably provided with flanges 22 by means of which the heating element can be secured to the floor of the car or to other support.

The operation will be readily understood from the foregoing detailed description of the structure.

By means of the pump J a circulation of heated liquid from the water jacket of the motor can be maintained through the liquid-receiving chamber. By the rotation of the fan air from within the car body is drawn into the fan casing and is driven along the air passage in the rear of the liquid-receiving chamber and is heated by being forced through the air passageways in said chamber. It passes out through the openings in the front wall of the casing and circulates through the car body and is again passed through the air passageways in the liquid-receiving chamber.

By this means a constant re-heating and recirculation of the air in the car body is maintained.

In warm weather the valve 6 may be closed and the unheated air may be circulated in the car body.

By providing a suitable resistance switch the speed of the fan may be varied as desired.

This heater is particularly adapted for use in the rear compartment of a two compartment car, or in the rear part of a car having a single compartment and two or more seats.

It may conveniently be located on the floor of the car, directly back of the front seat or partition (if the car is provided with a partition), where it is out of the way and takes up very little space.

The space between the compartments 2, 2 of the liquid-receiving and air-heating chamber is preferably much greater than the height or width of the compartments, and the tubes 3 are of such size as to provide large heat transfer surfaces, whereby the air passageways through the chamber have large air heating capacity and the overall length of the heater is much greater than its other dimensions. This arrangement brings the heated air currents near to the floor and at some distance from persons occupying the rear seat of the car.

With this heater located as described, a well known Caesar heater may be located also under the instrument board, or on the dash, for circulating and heating the air in a front compartment or in the front portion of the car.

The details of construction may be varied in many details without departing from my invention as set forth in the following claim.

I claim as my invention:

In a heater of the class described, a liquid-receiving chamber, said chamber comprising compartments spaced apart, a series of tubes connecting said compartments and through which liquid passes from one compartment to the other, a series of transverse plates arranged between said compartments through which said tubes pass, said plates being spaced apart and forming, with said compartments and tubes, air heating passageways through said chamber, a casing enclosing said chamber and providing an air passage along one side of said chamber, and exit openings at the other side, and an electric motor driven fan, and a fan casing having an air discharge into the air passage that extends along one side of said chamber.

In witness whereof, I have hereunto set my hand this 1st day of May, 1930.

FRED B. WINES.